United States Patent
Jeong

(10) Patent No.: US 9,742,012 B2
(45) Date of Patent: Aug. 22, 2017

(54) FUEL CELL AND MANUFACTURING METHOD THEREOF HAVING INTEGRATED MEMBRANE ELECTRODE ASSEMBLY AND GAS DIFFUSION LAYER

(71) Applicant: Hyundai Motor Company, Seoul (KR)

(72) Inventor: Byeong-Heon Jeong, Seongnam (KR)

(73) Assignee: Hyundai Motor Company, Seoul (KR)

( * ) Notice: Subject to any disclaimer, the term of this patent is extended or adjusted under 35 U.S.C. 154(b) by 456 days.

(21) Appl. No.: 14/453,933

(22) Filed: Aug. 7, 2014

(65) Prior Publication Data

US 2015/0207155 A1 Jul. 23, 2015

(30) Foreign Application Priority Data

Jan. 22, 2014 (KR) .................. 10-2014-0007989

(51) Int. Cl.
| | |
|---|---|
| H01M 8/02 | (2016.01) |
| H01M 4/86 | (2006.01) |
| H01M 8/0273 | (2016.01) |
| H01M 8/0271 | (2016.01) |
| H01M 8/0245 | (2016.01) |
| H01M 8/1007 | (2016.01) |
| H01M 8/1018 | (2016.01) |

(52) U.S. Cl.
CPC ....... *H01M 8/0273* (2013.01); *H01M 4/8657* (2013.01); *H01M 8/0245* (2013.01); *H01M 8/0271* (2013.01); *H01M 8/1007* (2016.02); H01M 2008/1095 (2013.01); Y02P 70/56 (2015.11)

(58) Field of Classification Search
None
See application file for complete search history.

(56) References Cited

U.S. PATENT DOCUMENTS

2010/0190084 A1* 7/2010 Shizuku ............. H01M 4/8615
429/480
2011/0311897 A1* 12/2011 Kato ................... H01M 8/0232
429/480

FOREIGN PATENT DOCUMENTS

| JP | 2005-100665 A | 4/2005 |
|---|---|---|
| JP | 2006107798 A | 4/2006 |
| JP | 2009140825 | 6/2009 |
| JP | 2009181951 A | 8/2009 |
| JP | 2009252666 | 10/2009 |

(Continued)

*Primary Examiner* — Jonathan Crepeau
(74) *Attorney, Agent, or Firm* — Mintz Levin Cohn Ferris Glovsky and Popeo, P.C.; Peter F. Corless

(57) ABSTRACT

A fuel cell having a membrane electrode assembly (MEA) comprising an electrolyte membrane, an anode and a cathode; and a gas diffusion layer (GDL) combined with both surfaces of the MEA is provided. In particular, the GDL includes a first layer having a first surface that comes in contact with a reaction region of the MEA, a second layer formed on a second surface of the first layer, and a third layer formed along a peripheral portion between a first region in which both the first layer and the second layer are formed and a second region in which only the second layer is formed. The first layer may be a first microporous layer, the third layer may be a second microporous layer having a viscosity lower than that of the first microporous layer, and the second layer is not the first microporous layer and the second microporous layer.

15 Claims, 4 Drawing Sheets

(56) References Cited

FOREIGN PATENT DOCUMENTS

| JP | 2009-259661 A | 11/2009 |
| JP | 2011-233537 A | 11/2011 |

* cited by examiner

[FIG. 1]
Related Art
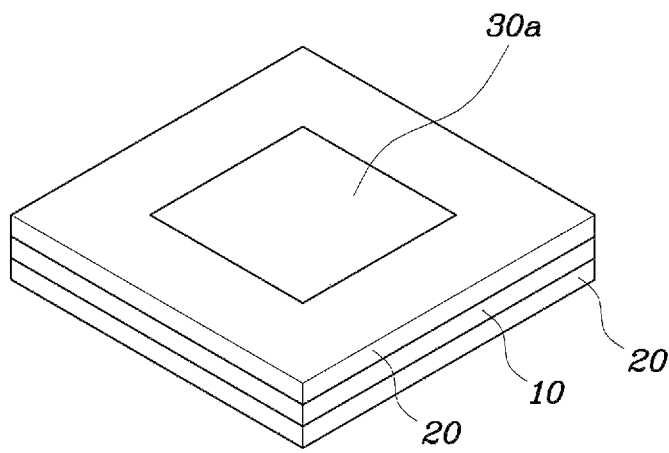
[FIG. 2A]
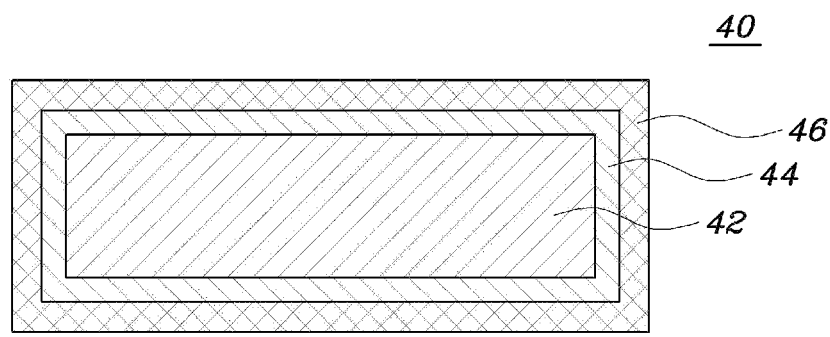

[FIG. 2B]
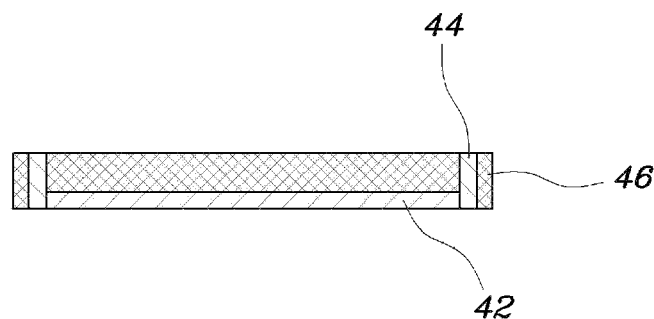
[FIG. 3]
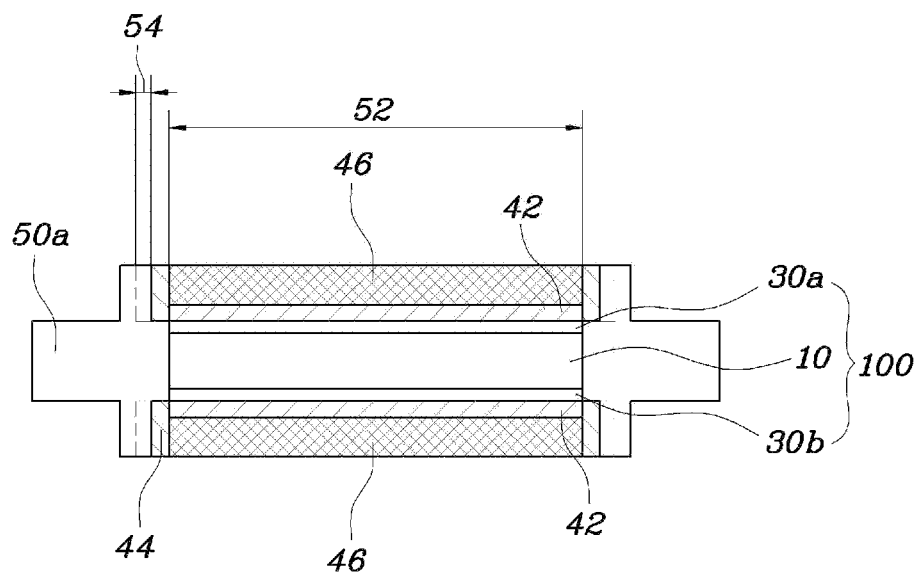

[FIG. 4]
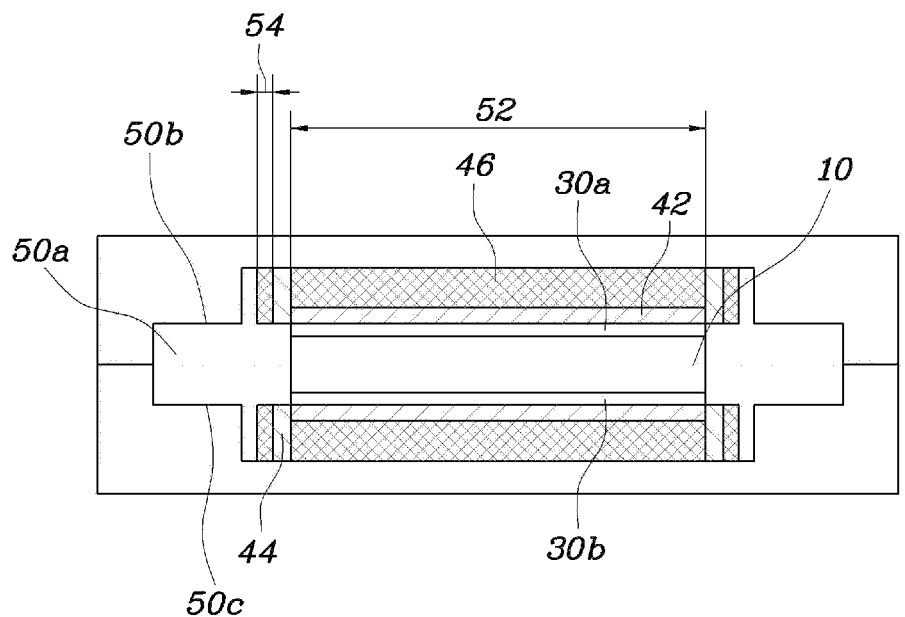
[FIG. 5A]
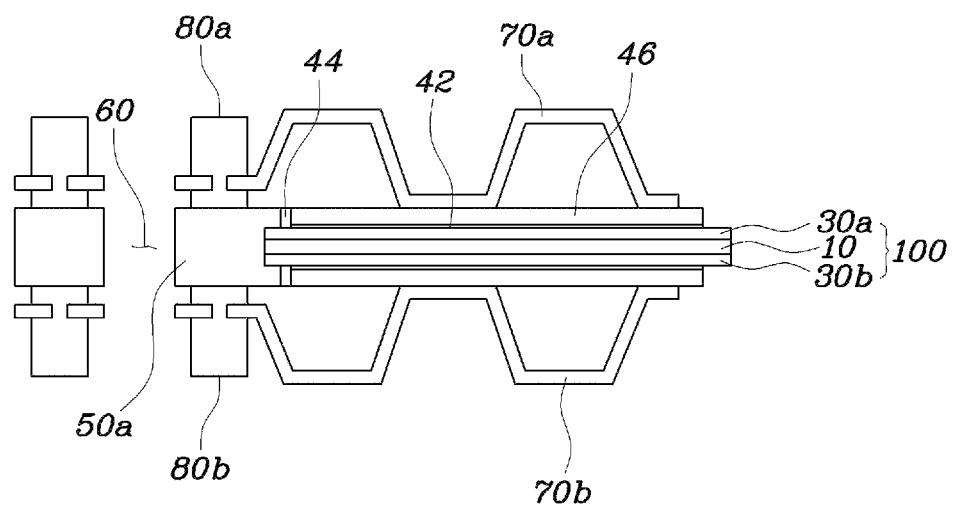

[FIG. 5B]
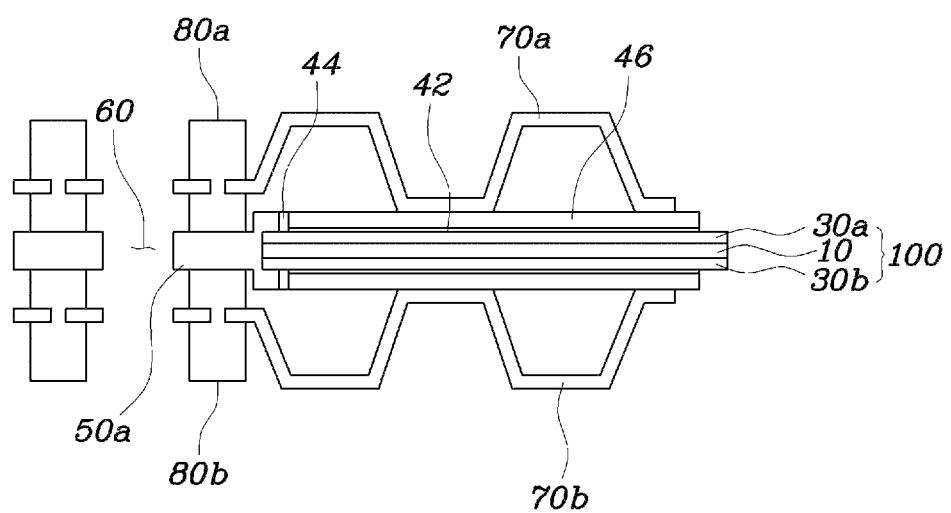

FUEL CELL AND MANUFACTURING METHOD THEREOF HAVING INTEGRATED MEMBRANE ELECTRODE ASSEMBLY AND GAS DIFFUSION LAYER

CROSS-REFERENCE(S) TO RELATED APPLICATION

The present application claims priority of Korean Patent Application Number 10-2014-0007989 filed on Jan. 22, 2014, the entire contents of which application is incorporated herein for all purposes by this reference.

BACKGROUND OF THE INVENTION

Field of the Invention

The present invention relates to a fuel cell and a manufacturing method thereof, and more particularly to a fuel cell comprising a membrane electrode assembly (MEA) integrated with a gas diffusion layer (GDL) and to a manufacturing method thereof.

Description of the Prior Art

Recently, in order to solve environmental pollution problems caused by the use of petroleum resources and cope with the exhaustion of petroleum resources, research and development on new and renewable sources of energy as possible alternative energy to the petroleum resources has received a great deal of attention.

As used herein, the term "fuel cell" refers to an electrochemical device that converts chemical energy directly into electrical energy through an electrochemical reaction between hydrogen, contained in a hydrocarbon-based material such as methanol, ethanol or natural gas, and oxygen supplied from the outside.

Fuel cells are classified, according to the kind of electrolyte, into molten carbonate fuel cells (MCFCs), solid oxide fuel cells (SOFCs), phosphoric acid fuel cells (PAFCs), polymer electrolyte membrane fuel cells (PEMFCs), direct methanol fuel cells (DMFCs) and the like.

In particular, fuel cells for most purposes operate on the same general principle, but are distinguished from each other by the kind of fuel they use, their operating temperature, the kind of catalyst that is implemented or the kind of electrolyte that is supplied.

Polymer electrolyte membrane fuel cells have advantages over other types of fuel cells in that they have high power density and efficiency, low operating temperatures, and a fast start and response characteristics. Due to such advantages, polymer electrolyte membrane fuel cells can be used in various applications, including as a power source in a vehicle, distributed power sources for residential applications, power sources for various portable devices, etc.

Fuel cells are used to convert chemical energy, produced by oxidation of fuel, directly into electrical energy. In the fuel electrode (anode) of the fuel cell, the oxidation reaction of hydrogen occurs, and in the air electrode (cathode), the reduction reaction of oxygen occurs. The overall fuel cell reaction is an inverse of water electrolysis, which produces electricity, heat and water.

A fuel cell unit typically is made up of an electrolyte membrane, electrodes (anode and cathode), a gas diffusion layer (GDL) and a separator. Such fuel cell units are assembled to form a fuel cell stack.

A structure composed of electrodes attached an electrolyte membrane is referred to as a membrane electrode assembly (MEA). The electrolyte membrane of the MEA is made mainly of an ion conductive polymer. The material of the electrolyte membrane is required to have high ion conductivity, show a high mechanical strength at a humidity of 100%, and have low gas permeability, and high thermal and chemical stability.

Also, the GDL can serve as a passage that allows the hydrogen and air introduced from the separator to be finely diffused and supplied to the MEA, while supporting a catalyst layer, allowing electric current generated in the catalyst layer to move to the separator, and enabling produced water to flow out of the catalyst layer. The GDL are typically provided on the upper and lower surfaces of the MEA and are made of a material such as carbon felt, carbon paper or carbon cloth.

FIG. 1 shows an MEA structure fabricated using a conventional lamination technology. The MEA structure shown in FIG. 1 is formed by applying a polymer film sheet 20 to both surfaces of an electrolyte membrane 10, thermally compressing the applied film sheet 20, and coating a catalyst layer 30a on the surface of the thermally compressed film sheet 20 applied to both surfaces of the electrolyte membrane 10.

However, the MEA is very thin (50 μm or less), and thus can be damaged during transport. Particularly, when the alignment between the MEA and the GDL during lamination is poor, lamination quality can be deteriorated. Currently, in most cases, the GDL and the MEA are simply laminated by a thermal compression method.

This low quality lamination between the MEA and the GDL leads to the poor performance of fuel cells, and in severe cases, the fuel cells are classified as defective products, and thus the use and supply thereof are limited. Accordingly, there is an urgent need for a solution to this problem.

The foregoing is designed merely to aid in the understanding of the background of the present invention, and is not intended to mean that the present invention falls within the purview of the related art that is already known to those of ordinary skill in the art.

SUMMARY OF THE INVENTION

Accordingly, the present invention has been made in order to solve the above-described problems occurring in the art, and it is an object of the present invention to provide a fuel cell comprising a GDL integrated with an MEA, and a manufacturing method thereof.

To achieve the above object, the present invention provides a fuel cell including: the MEA comprising an electrolyte membrane, an anode and a cathode; and the GDL combined with or integrated with both surfaces of the MEA. In particular, the GDL comprises a first layer whose one surface comes in contact with a reaction region of the MEA, a second layer formed on the other surface of the first layer, and a third layer formed along a peripheral portion between a first region in which both the first layer and the second layer are formed and a second region in which only the second layer is formed. The first layer may comprise a first microporous layer, the third layer may comprise a second microporous layer made of a material having a viscosity lower than that of the first microporous layer, and the second layer does not comprise the first microporous layer and the second microporous layer.

The fuel cell may further include an injection-molded frame configured to integrate the MEA with the GDL. The frame may be formed of a polymer material, a metal material or a ceramic material. As a particular example, a liquid crystal polymer (LCP) which is injection-moldable and insulative can be used. The frame may be isolated from the first layer and come in contact with the third layer. The frame may also be isolated from the first region by the third layer.

The fuel cell may further include manifolds, one side of the frame comes in contact with the side of each of the MEA with the GDL, and the other side of the frame comes into contact with the manifolds.

The present invention also provides a method for manufacturing a fuel cell, the method comprising combining a GDL with both surfaces of an MEA comprising an electrolyte membrane, an anode and a cathode, the GDL composed of a first layer, a second layer and a third layer, which have different distances from the MEA, wherein the first layer comprises a first microporous layer, the third layer comprises a second microporous layer made of a material having a viscosity lower than that of the first microporous layer, and the second layer does not comprise the first microporous layer and the second microporous layer.

The method may further include injection-molding a frame configured to integrate the MEA with the GDL. The frame may be formed of a polymer material, a metal material or a ceramic material. As a particular example, a liquid crystal polymer (LCP) which is injection-moldable and insulative can be used. The frame may be combined with the side of each of the MEA and the GDL so as to integrate the MEA with the GDL.

BRIEF DESCRIPTION OF THE DRAWINGS

The above and other objects, features and advantages of the present invention will be more clearly understood from the following detailed description taken in conjunction with the accompanying drawing, in which:

FIG. 1 shows an MEA structure fabricated using a conventional lamination technology;

FIG. 2A is a top view of a GDL 40 according to an exemplary embodiment of the present invention;

FIG. 2B is a side view of a GDL 40 according to an exemplary embodiment of the present invention;

FIG. 3 shows a fuel cell comprising a combination of a GDL 40, an electrolyte membrane 10, a catalyst layer 30a, 30b and a frame 50a according to an exemplary embodiment of the present invention;

FIG. 4 shows an upper mold 50b and a lower mold 50c, which are used to form a frame 50a by an injection molding process according to an exemplary embodiment of the present invention, and an injection-molded frame 50a; and FIGS. 5A and 5B show the shape and location of a frame 50a according to an exemplary embodiment of the present invention.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

FIGS. 2A and 2B show a top view and a side view of a GDL 40 according to an exemplary embodiment of the present invention individually; FIG. 3 shows a fuel cell comprising a combination of a GDL 40, an electrolyte membrane 10, a catalyst layer 30a, 30b and a frame 50a according to an exemplary embodiment of the present invention; and FIG. 4 shows an upper mold 50b and a lower mold 50c, which are used to form a frame 50a by an injection molding process according to an exemplary embodiment of the present invention, and an injection-molded frame 50a.

Referring to FIGS. 2A and 2B, the GDL 40 according to an exemplary embodiment of the present invention comprises a first layer 42 adjacent to the reaction region of the MEA 100, a second layer 46, and a third layer 44 disposed outside the first layer 42. The first layer 42 comprises a first microporous layer, and the third layer 44 comprises a second microporous layer made of a material having a viscosity lower than the material of the first microporous layer. The second layer 46 may not comprise the first microporous layer and the second microporous layer.

Also, the third layer 44 may include an adhesive component, and the second layer 46 may not comprise a microporous layer and an adhesive component.

Referring to FIGS. 3 and 4, the GDL 40 according to an embodiment of the present invention is combined (embedded in) with both surfaces of the MEA 100, and the GDL 40 and the MEA 100 may be integrated with each other by an injection-molded frame 50a. Specifically, the frame 50a can be injection-molded on the sides of the MEA 100 and the GDL 40 inserted between an upper mold 50b and a lower mold 50c so as to integrate the MEA 100 with the GDL 40. This frame 50a may be made of a polymer material, particularly a liquid crystal polymer (LCP), a metal material or a ceramic material. Further, it may be made of an electrically insulating material.

The GDL 40 may comprise a first layer 42 whose one surface is adjacent to the reaction region of the MEA 100, a second layer 46 formed on the other surface of the first layer 42, and a third layer 44 formed along a peripheral portion between a first region 52 (reaction region) in which both the first layer 42 and the second layer 46 are formed and a second region 54 in which only the second layer 46 is formed. The first layer 42 comprises a first microporous layer, and the third layer 44 comprises a second microporous layer made of a material having a viscosity lower than the material of the first microporous layer. The second layer 46 should not comprise the first microporous layer and the second microporous layer.

The third layer 44 may also be an adhesive component. In this case, the first layer 42 comprises a microporous layer, the third layer 44 comprises an adhesive component, and the second layer 46 does not comprise a microporous layer and an adhesive component.

The frame 50a in the exemplary embodiment of the present invention is preferably not adjacent to the first layer 42 and is adjacent to the third layer 44. The frame 50a may be isolated from the first region 52 by the third layer 44. In other words, the third layer 44 functions to isolate the frame 50a from the first region 52 consisting of the first layer 42 and second layer 46. On the other hand, during injection molding, the frame 50a may be formed on the second layer 46 portion formed in the second region 54. The second layer 46 may be made of material having relatively high porosity.

In other words, the material forming the frame 50a may penetrate into the second layer 46 portion corresponding to the second region 54. For example, when the material of the frame 50a is a liquid polymer material, this material does not come in contact with the first layer 42 and second layer 46 of the first region 52 due to the third layer 44 formed between the frame 50a and the first region 52, but may penetrate into the second layer 46 portion formed in the second region 54. In connection with this, FIG. 3 shows a structure in which the material of the frame 50a penetrated into a portion of the second layer 46 formed in the second region 54, and FIG. 4 shows the upper mold 50b, the lower mold 50c and the frame 50a formed in the mold.

FIGS. 5A and 5B show the shape and location of a frame 50a according to an embodiment of the present invention. As shown in FIGS. 5A and 5B, a fuel cell according to an exemplary embodiment of the present invention may comprise manifolds 60. One side of the frame 50a may come in contact with each side of the MEA 100 and the GDL 40, and the other side of the frame 50a may be adjacent to the manifold 60. As shown in FIG. 5B, the thickness of a portion of the frame 50a, which is adjacent to the manifold 60, may be less than the thickness of a portion of the frame 50a, which comes in contact with the side of each of the MEA 100 and the GDL 40.

As described above, according to the present invention, the MEA and the GDL are integrated with each other by an injection molding process, and thus can be easily assembled and handled. The loss of the MEA can be eliminated, thus reducing the costs of production. Further, the number of processes for producing the fuel cells can be reduced, and thus the production line can be simplified and the productivity can be increased.

Moreover, the injection molding process can be performed in an automated and accurate manner, and thus the product's failure rate can be reduced and mass production becomes possible. Also, because there is no electrolyte membrane on the manifold side, it is possible to reduce corrosion of the wall portion of a fuel cell stack, which can be caused by a phenomenon in which water produced by electrochemical reactions flows out of the fuel cell through the electrolyte membrane. Also, it is possible to ensure stable electrical insulation.

Finally, since the frame is formed outside the reaction region of the MEA, the GDL can be prevented from being broken and over-compressed when it is compressed by the separator during cell assembling.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A fuel cell comprising:
a membrane electrode assembly (MEA) having an electrolyte membrane, an anode and a cathode; and
a gas diffusion layer (GDL) integrated into both surfaces of the membrane electrode assembly,
wherein the gas diffusion layer includes a first layer having one surface that comes in contact with a reaction region of the membrane electrode assembly, a second layer formed on the other surface of the first layer, and a third layer formed along a peripheral portion between a first region in which both the first layer and the second layer are formed and a second region in which only the second layer is formed,
wherein the first layer and third layer comprise a microporous layer and the microporous layer of the third layer is extended from the one surface in the direction of a separator longer than the microporous layer of the first layer.

2. The fuel cell according to claim 1, wherein the first layer is a first microporous layer, the third layer is a second microporous layer made of a material having a viscosity lower than that of the first microporous layer, and the second layer does not comprise the first microporous layer and the second microporous layer.

3. The fuel cell according to claim 1, wherein the third layer comprises an adhesive component.

4. The fuel cell according to claim 1, further comprising a frame configured to integrate the MEA with the GDL.

5. The fuel cell according to claim 4, wherein the frame is formed of a polymer material, a metal material or a ceramic material.

6. The fuel cell according to claim 4, wherein the frame is isolated from the first layer and comes in contact with the third layer.

7. The fuel cell according to claim 4, wherein the frame is isolated from the first region by the third layer.

8. The fuel cell according to claim 4, wherein a material forming the frame penetrates into a portion of the second layer, which is formed in the second region.

9. The fuel cell according to claim 4, wherein the fuel cell further comprises at least one manifold, one side of the frame comes in contact with the MEA and the GDL, and the other side of the frame comes in contact with the manifold.

10. A method for manufacturing a fuel cell, the method comprising: combining a gas diffusion layer (GDL) with both surfaces of a membrane electrode assembly (MEA) having an electrolyte membrane, an anode and a cathode, the gas diffusion layer comprising a first layer whose one surface comes in contact with a reaction region of the membrane electrode assembly, a second layer formed on the other surface of the first layer, and a third layer formed along a peripheral portion between a first region in which both the first layer and the second layer are formed and a second region in which only the second layer is formed, wherein the first layer and the third layer comprise a microporous layer and the microporous layer of the third layer is extended from the one surface in the direction of a separator longer than the microporous layer of the first layer.

11. The method according to claim 10, wherein the first layer is a first microporous layer, the third layer is a second microporous layer made of a material having a viscosity lower than that of the first microporous layer, and the second layer is not made of the first microporous layer and the second microporous layer.

12. The fuel cell according to claim 10, wherein the third layer comprises an adhesive component.

13. The method according to claim 10, further comprising injection-molding a frame configured to integrate the MEA with the GDL.

14. The method according to claim 13, wherein the frame is formed of a polymer material, a metal material or a ceramic material.

15. The method according to claim 13, wherein the frame is combined with the side of each of the membrane electrode assembly and the gas diffusion layer so as to integrate the membrane electrode assembly with the gas diffusion layer.

* * * * *